US008097867B2

(12) United States Patent
Bar et al.

(10) Patent No.: US 8,097,867 B2
(45) Date of Patent: Jan. 17, 2012

(54) IRRADIATION DEVICE

(75) Inventors: Kai K. O. Bar, Bad Aibling (DE); Rolf Wirth, Bruckmuhl (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 508 days.

(21) Appl. No.: 12/303,294

(22) PCT Filed: May 16, 2007

(86) PCT No.: PCT/EP2007/004403

§ 371 (c)(1), (2), (4) Date: Dec. 3, 2008

(87) PCT Pub. No.: WO2007/147466

PCT Pub. Date: Dec. 27, 2007

(65) Prior Publication Data

US 2009/0184267 A1 Jul. 23, 2009

(30) Foreign Application Priority Data

Jun. 22, 2006 (DE) ........................ 10 2006 028 702

(51) Int. Cl.
*G01J 3/10* (2006.01)

(52) U.S. Cl. .................................................. 250/504 R

(58) Field of Classification Search .............. 250/504 R, 250/493.1, 494.1; 362/217, 218, 225
See application file for complete search history.

(56) References Cited

U.S. PATENT DOCUMENTS

| | | | | |
|---|---|---|---|---|
| 5,142,795 | A | 9/1992 | Abbott | |
| 5,861,633 | A * | 1/1999 | Mandellos | 250/504 R |
| 6,646,278 | B1 * | 11/2003 | Schwarz et al. | 250/504 R |
| 7,692,170 | B2 * | 4/2010 | Gaus et al. | 250/504 R |

FOREIGN PATENT DOCUMENTS

| | | |
|---|---|---|
| DE | 10051905 | 4/2002 |
| DE | 10051641 | 5/2002 |
| DE | 10051642 | 5/2002 |
| DE | 10238253 | 3/2004 |
| DE | 10257432 | 7/2004 |
| GB | 2091859 | 8/1982 |
| WO | 2004088713 | 10/2004 |
| WO | 2005105448 | 11/2005 |
| WO | 2006015694 | 2/2006 |

* cited by examiner

*Primary Examiner* — Kiet Nguyen
(74) *Attorney, Agent, or Firm* — Volpe and Koenig, P.C.

(57) ABSTRACT

Radiation apparatus for technical use, with a large number of stretched-out radiation sources emitting in or between the UV and IR ranges and a large number of main reflector segments that are bent and/or folded out of metal sheet in a shape adapted to that of the radiation sources, while the main reflector segments are formed as separate main reflectors and are held, singly replaceable and independently of the radiation sources, in a radiation source housing.

14 Claims, 1 Drawing Sheet

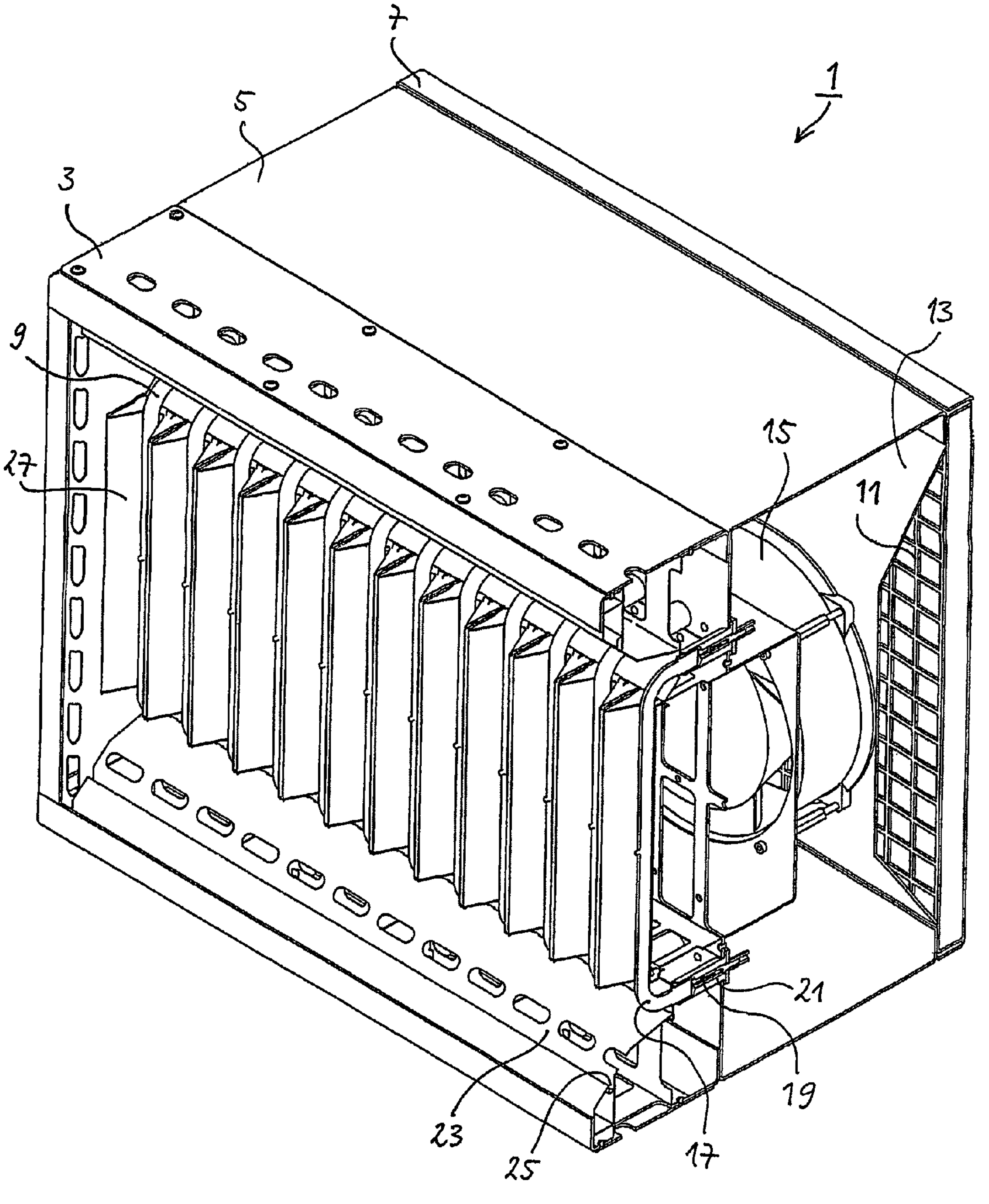
1
3
5
7
9
11
13
15
17
19
21
23
25
27

IRRADIATION DEVICE

BACKGROUND

The invention relates to an irradiating apparatus.

Processes for the treatment of paint coatings, surface structures or printing dyes through the use of electromagnetic radiation are known, whose essential active component lies in the range of near infrared, in particular in the wavelength range between 0.8 μm and 1.5 μm, or in the range of ultraviolet radiation (UV range). With these applications, the creation typically of a relatively large-area radiation zone with high power density in the interests of high productivity of the relevant process is important.

This is from where the use of several stretched-out halogen lamps arranged in parallel with one another, which have a tubular glass body with sockets at the ends with at least one incandescent filament, in a stretched-out reflector as a radiation arrangement for thermal radiation processes is also known. The very high power density values realised with such radiation arrangements above (to some extent far above) 100 $kW/m^2$ require cooling to warrant an adequate useful life of the lamps and the shape stability of the reflector arrangements.

This is why a modular irradiating arrangement with NIR radiation sources and integrated liquid cooling of the reflector is proposed in DE 100 51 641 A1, which goes back to the applicant.

A radiation arrangement for the realisation of processes of the aforementioned nature is known from DE 100 51 642 A1, which has a cooled main reflector, which bears stretched-out halogen lamps, and separate side reflectors arranged at its sides. These are in particular arranged perpendicular to the plane extending through the central axes of the halogen lamps on the main reflector.

A radiation source with stretched-out halogen lamps is known from DE 100 51 905 A1, which also goes back to the application, whose ends are bent towards the glass body and are thickened or narrowed. In a preferred embodiment, coolants for heat dissipation are assigned to the lamp ends, which are supposed to ensure a steep T-gradient between the bent zones of the glass body and the neighbouring electrical terminals. In an even more special embodiment, a compressed air flow duct with outlet openings arranged close to the ends of the glass body is provided for cooling.

In DE 102 57 432 A1, an air-cooled radiation arrangement is proposed, which encompasses a reflector fitted at the rear with cooling fins and a specially designed duct arrangement to guide cooling air supplied by a fan to the rear of the reflector.

The aforementioned radiation sources or radiation apparatus have now proven themselves excellently in diverse applications, achieve long useful lives and supply radiation zones largely with the parameters required by users. Nevertheless, application situations have arisen in which the prerequisites necessary for the use of specific radiation arrangements—for example cooling water or compressed air ports—are not fulfilled. Moreover, upper cost limits are low in certain applications and compliance with them using known designs is problematic.

SUMMARY

The invention is therefore based on the object of providing an improved radiation apparatus that is distinguished by a low-cost and maintenance-friendly structure and which can be adapted easily to diverse applications.

This object is resolved by a radiation or irradiating apparatus or, in a relatively independent variant of the concept, by a radiation apparatus according to the invention. Expedient enhancements of the invention's concept are the subject of the pending claims.

The invention includes the essential idea of providing, while diverging from previously prevailing lines of development, a lightweight radiation apparatus with a correspondingly low thermal mass and thus low thermal inertia. It also includes the idea of manufacturing at least the most important reflector components out of sheet metal, which is brought to the required shape in a cost-saving fashion by means of simple operations (folding, possibly bending). Finally, the invention also includes the idea of manufacturing the main reflector segments assigned to the radiation sources as separate modules and of fixing them in an easily replaceable manner in holder or a housing of the radiation apparatus.

This combination of features not only enables low-cost manufacture of the most important system components, but also their easy assembly and—if necessary—dismantling and replacement or simply removal, for the realisation of a reduced-power system, in compliance with special user requirements. The lightweight design made of low-cost source materials also enables substantial material savings and, moreover, easier handling of the reflectors and, if applicable, further system parts.

In the second essential approach, the invention includes the idea of achieving boosted flexibility in adaptation to different user requirements and conditions of use by means of a modular structure of the radiation apparatus. In this connection, the invention also includes the idea of providing a separate radiation source holder part and at least one air cooler part—but preferably diverse air cooler parts—and of connecting them up according to needs. As a result, variants with internal cooling and variants for connection to external fans or even compressed air supplies can be realised.

Particular flexibility can be achieved by a combination of the modularity of the single radiation source plane with the modularity of the housing structure.

In a preferred embodiment of the invention according to the aforementioned concept, it is intended for the main reflectors to have a length essentially corresponding to the length of a straight section of the radiation sources and socket segments of the radiation sources are arranged beyond the ends of the main reflectors in the radiation source housing. As a result, the main reflectors can be manufactured in a particularly simple profile design and thus at particularly low cost, because the sensible more complex reflector geometry in the area of the lamp ends is then no longer part of the main reflectors.

Particular simplicity in assembly and maintenance of the radiation apparatus can be achieved by virtue of the fact that the main reflectors are secured by means of a latching or clamping facility in the radiation source housing, which in particular can be opened without tools. Simple gripping of the main reflectors and the realisation of simple hand motions suffice to insert the main reflectors in or remove them from the radiation source housing so that reflectors subjected to excessive thermal stress, for example, or which are soiled, can also be replaced easily and safely by less-qualified personnel.

A variant of the radiation apparatus that does justice to the visual requirements and which at the same time costs little can be realised by virtue of the fact that the main reflectors have the form of a channel inscribed into a parallelepiped, in particular with a W or a V profile. This form can be realised by simply folding a thin metal sheet (especially an aluminium sheet with a high-grade surface on at least one side).

A further preferred embodiment is characterised by the fact that the radiation sources have socket segments at their sides opposite the line of the longitudinal extension that are offset and vertical to this line and end reflector segments are assigned to the socket segments. These are separate from the main reflectors and, especially for a large number of radiation sources, jointly formed by end reflectors bent and/or folded out of sheet metal and secured separately from the main reflectors in the radiation source housing. These also can be manufactured at low cost out of sheet metal (Al sheet) by means of simple folding operations, and in a form adapted to the special visual conditions at the lamps' ends. If, as is usual, the radiation sources consist of NIR sources (or possibly also UV sources) with a radiation source body bent towards the socket segment, this looks like the end reflectors have a matching trough shape with reflector walls at different heights and/or slanting angles.

In the interests of a long useful life of the main reflectors and radiation sources, it is planned for outer walls of the radiation sources to be shaped in such a way and the main reflectors held in such a way in the radiation source housing that initial cooling air passages are formed between them. Cooling air blown in from the rear of the reflectors then passes through between the main reflectors and cools their edges as well as the middle part, so as to largely rule out thermal deformation processes, and easily replaceability is maintained even after a prolonged operating time.

In a further preferred embodiment it is planned for second cooling air passages for cooling of the radiation source end to be formed in the end reflectors. As is known, the ends of the radiation source require particular attention during cooling because they are subject to particular thermal stresses and thermally sensitive components are arranged in practically widespread radiation source designs.

It is also expediently intended to provide holders for sockets of the radiation sources in the radiation source holder part which are fixed by fixing means arranged in the air cooler part and are electrically connected via supply leads running in the air cooler part. The supply leads and terminals can be fitted and, if applicable, maintained with particular ease.

One expedient embodiment of the proposed radiation apparatus according to the second conceptual approach was distinguished by the fact that the radiation source holder part and the air cooler part are realised as a parallelepiped of conforming length and width. If required, further parallelepiped-shaped parts with coordinated dimensions can complete the radiation unit for special requirements.

In a first preferred embodiment, it is intended for the air cooler part to accommodate a blower fan and has a first and second main surface opposite one another, while the radiation source holder part is fitted on the first main surface and an air filter plate is fitted on the second main surface. The air filter plate can constitute a further parallelepiped-shaped part or a rectangular plate in the sense of the above-mentioned completion, and diverse variants of filter plates can be assigned in modular fashion to the air cooler part. In a preferred embodiment of this variant, between the blower fan and the air filter plate it is planned to place a conical wall segment, or one that is shaped like a truncated pyramid that is funnelled towards the blower fan.

In an alternative variant of the air cooler part, it is intended for the air cooler part to accommodate an air duct port for an external blower fan and a first and second main surface opposite one another, while the radiation source holder part is fitted on the first main surface and the second main surface is closed. A standardised compressed air port for connection to a central compressed air supply can also be provided and, if applicable, this can also be arranged on the second main surface, while the side faces of the air cooler part will be closed.

On the front side, the radiation source housing for special applications can be closed. This is preferably ensured by virtue of the fact that the radiation source housing has a guide extending above upper edges of the main reflectors and optional end reflectors for accommodation of a protective pane. Instead of a pure protective pane, a filter pane can also be used here to filter out undesirable radiation components or, if applicable, also a protective grille or similar.

BRIEF DESCRIPTION OF THE DRAWING

Advantages and practicalities of the invention otherwise result from the following description of a preferred variant with reference to the single FIGURE.

DETAILED DESCRIPTION OF THE PREFERRED EMBODIMENTS

In a partly truncated perspective view, this shows a radiation apparatus 1 that operates in the near infrared range which, in a modular design in the variant shown here, is separably composed of a radiation source holder part 3, an air cooler part 5 and an air filter plate 7. These components have the same length and width and, when assembled together, they therefore have a device body in the form of a parallelepiped that can be handled well and assembled in a production installation. This is shown with exposed NIR radiation sources 9, the front side of the radiation source holder part 3, which is hereinafter referred also to as the the radiation source housing, but which can also be sealed by a protective pane.

It can be seen that the rear of the air filter plate 7 is formed by a grille 11 that allows cooling air sucked in to pass through a funnel 13 shaped approximately like a truncated pyramid and at the same time offers support for a filter material intended there (not shown in the FIGURE). The air cooler part 5, whose one face faces the air filter plate 7 and is formed to a certain extent by the intake funnel 13 and whose other face faces the radiation source holder part 3, contains one or several blower fan(s) 15, with which cooling air is sucked in from the atmosphere and is blown into the radiation source holder part 3 to cool the radiation sources 9 and associated reflectors.

In the FIGURE we can also see that the radiation sources 9 have a glass body 17 that is extended in a straight line over the largest proportion of its overall extension and bent at both ends and, at its two ends, sockets 19 with plug contacts. These are accommodated in sockets 21, which are attached on the face of the radiation source housing 3 adjacent to the air cooler part 5. Supply leads to these sockets 21, which are not shown, run in the air cooler part 5 and are routed from there to a collective electrical terminal of the radiation apparatus 1.

All radiation source ends are each assigned an end reflector shaped by folding into an asymmetrical trough shape made of aluminium sheet 23 in which a number of holes corresponding to the number of radiation sources has been incorporated for passage of the radiation source ends. The side faces of the end reflectors running beyond the radiation source ends extends to beyond the radiation source plane so as to produce particularly efficient use of the radiation and, moreover, even distribution of the radiation field in these zones.

The centre zones of the glass bodies 17 of the radiation sources 9, which run in a straight line, are each singly assigned a main reflector 27 held replaceably in the radiation source housing 3. In the form of channels with an approximately parallelepiped-shaped outer contour, the main reflectors 27 are also made out of Al sheet by folding and are placed in a row parallel to one another at short distances in the radiation source housing. They are held with (not recognisable in the FIGURE) latching or snap connections in suitable carrier sheets of the radiation source housing 3 and can be inserted and removed there manually without the assistance of a tool.

In the FIGURE it can be seen that the carrying sheet structure of the radiation housing 3 features numerous openings through which the cooling air supplied by the blower fan 15 can pass behind and between the end and main reflectors and can also be applied to the sensitive radiation source ends so as to also avoid thermal overloads during prolonged operation with a high power output.

The realisation of the invention is not limited to this example, but is also possible in a diverse range of variants that lie within the scope of technical action. In particular, all combinations of characteristics of the pending claims can be considered to be within the scope protected by the invention.

The invention claimed is:

1. Irradiating apparatus for technical use, comprising a large number of stretched-out radiation sources emitting in or between UV and IR ranges and a large number of bent or folded sheet metal main reflector segments that each have a shape adapted to that of a respective one of the radiation sources, the main reflector segments are formed as separate main reflectors and are held, singly replaceable and independently of the radiation sources, in a radiation source housing.

2. Apparatus according to claim 1, the main reflectors to have a length essentially corresponding to a length of a straight section of the radiation sources and socket segments of the radiation sources are arranged beyond ends of the main reflectors in the radiation source housing.

3. Apparatus according to claim 1, wherein the main reflectors are secured in the radiation source housing, which can be opened without tools.

4. Apparatus according to claim 1, wherein the main reflectors each have the form of a channel inscribed into a parallelepiped with a W or a V profile.

5. Apparatus according to claim 1, wherein the radiation sources have socket segments at sides thereof opposite a line of longitudinal extension that are offset and vertical to this line and end reflector segments are assigned to the socket segments which, for a large number of radiation sources, are jointly formed by end reflectors bent or folded out of metal sheet that are secured separately from the main reflectors in the radiation source housing.

6. Apparatus according to claim 5, wherein the radiation sources consist of NIR sources with a radiation source body bent towards the socket segment and the end reflectors have a matching trough shape with reflector walls at different heights or slanting angles.

7. Apparatus according to claim 5, wherein outer walls of the radiation sources are shaped in such a way and the main reflectors held in such a way in the radiation source housing that initial cooling air passages are formed between them.

8. Apparatus according to claim 7, wherein second cooling air passages are formed in the end reflectors to cool the radiation source ends.

9. Apparatus according to claim 1, wherein the radiation source housing comprises a multiple-part radiation source housing, at least a major part of which is made of sheet metal, which has a radiation source holder part and an air cooler part linked thereto, which can be removed.

10. Apparatus according to claim 9, wherein the radiation source holder part and the air cooler part are each formed as parallelepipeds having a same length and width.

11. Apparatus according to claim 9, wherein the air cooler part accommodates a blower fan and has first and second main surfaces opposite one another, while the radiation source holder part is fitted on a first main surface thereof and an air filter plate is fitted on a second main surface thereof.

12. Apparatus according to claim 11, wherein between the blower fan and the air filter plate there is a conical wall segment, or a wall segment that is shaped like a truncated pyramid that is funnelled towards the blower fan.

13. Apparatus according to claim 9, wherein the air cooler part accommodates a funnel-shaped duct that supports at least one blower fan and has first and second main surfaces located opposite one another, while the radiation source holder part is fitted on the first main surface and the second main surface is closed.

14. Apparatus according to claim 9, wherein holders are provided for sockets of the radiation sources in the radiation source holder part.

* * * * *